(12) United States Patent
Li et al.

(10) Patent No.: US 8,694,528 B2
(45) Date of Patent: *Apr. 8, 2014

(54) DYNAMIC DETERMINATION OF LOCATION-IDENTIFYING SEARCH PHRASES

(75) Inventors: Xin Li, North Bergen, NJ (US); Dolapo Falola, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/181,231

(22) Filed: Jul. 12, 2011

(65) Prior Publication Data

US 2011/0270884 A1 Nov. 3, 2011

Related U.S. Application Data

(63) Continuation of application No. 12/099,762, filed on Apr. 8, 2008, now Pat. No. 7,987,195.

(51) Int. Cl.
*G06F 17/30* (2006.01)
(52) U.S. Cl.
CPC .............................. *G06F 17/30017* (2013.01)
USPC .......................................................... 707/765
(58) Field of Classification Search
USPC ................................................. 707/600–831
See application file for complete search history.

(56) References Cited

U.S. PATENT DOCUMENTS

| | | | |
|---|---|---|---|
| 5,257,242 A | 10/1993 | Clawson | |
| 5,265,065 A | 11/1993 | Turtle | |
| 5,692,176 A | 11/1997 | Holt et al. | |
| 5,960,435 A | 9/1999 | Rathmann et al. | |
| 6,321,227 B1 | 11/2001 | Ryu | |
| 6,711,567 B2 | 3/2004 | Littlefield et al. | |
| 6,865,567 B1 | 3/2005 | Oommen et al. | |
| 6,904,409 B1 | 6/2005 | Lambert et al. | |
| 7,257,570 B2 | 8/2007 | Riise et al. | |
| 7,340,460 B1 | 3/2008 | Kapur et al. | |
| 7,426,507 B1 | 9/2008 | Patterson | |
| 7,483,881 B2 | 1/2009 | Egnor et al. | |

(Continued)

FOREIGN PATENT DOCUMENTS

| | | |
|---|---|---|
| WO | 01/40968 A2 | 6/2001 |
| WO | 01/63479 A1 | 8/2001 |

(Continued)

OTHER PUBLICATIONS

Ziming Zhuang et al., Towards Click-based Models of Geographic Interests in Web Search, Dec. 9-12, 2008, IEEE, 293-299.*

(Continued)

*Primary Examiner* — Jean B Fleurantin
(74) *Attorney, Agent, or Firm* — Brake Hughes Bellermann LLP

(57) ABSTRACT

A computer-implemented method includes providing location factors for first phrases in a collection of phrases, where each location factor for a first phrase is associated with a likelihood that a second phrase of a search query is associated with a location when the first phrase and the second phrase are used in the search query. A search query is received, where the received search query includes a first phrase from the collection of phrases and a second phrase. Whether the second phrase of the received search query refers to a location is determined based, at least in part, on the location factor for the first phrase of the search query.

20 Claims, 4 Drawing Sheets

(56) References Cited

U.S. PATENT DOCUMENTS

| | | | |
|---|---|---|---|
| 7,502,783 B2* | 3/2009 | Palmon et al. | 1/1 |
| 7,693,813 B1 | 4/2010 | Cao et al. | |
| 7,698,626 B2* | 4/2010 | Baluja et al. | 715/205 |
| 7,702,614 B1 | 4/2010 | Shah et al. | |
| 7,925,498 B1* | 4/2011 | Baker et al. | 704/9 |
| 2001/0011270 A1 | 8/2001 | Himmelstein et al. | |
| 2002/0156779 A1 | 10/2002 | Elliott et al. | |
| 2003/0182171 A1 | 9/2003 | Vianello | |
| 2004/0133927 A1 | 7/2004 | Sternberg et al. | |
| 2004/0139049 A1 | 7/2004 | Hancock et al. | |
| 2004/0205461 A1 | 10/2004 | Kaufman et al. | |
| 2005/0065916 A1 | 3/2005 | Ge et al. | |
| 2005/0080786 A1 | 4/2005 | Fish et al. | |
| 2005/0108213 A1 | 5/2005 | Riise et al. | |
| 2005/0187823 A1 | 8/2005 | Howes | |
| 2006/0027151 A1 | 2/2006 | Kaiya et al. | |
| 2006/0085392 A1 | 4/2006 | Wang et al. | |
| 2006/0149742 A1 | 7/2006 | Egnor | |
| 2007/0198495 A1 | 8/2007 | Buron et al. | |
| 2008/0154888 A1 | 6/2008 | Buron et al. | |

FOREIGN PATENT DOCUMENTS

| | | | |
|---|---|---|---|
| WO | 01/65410 A2 | 9/2001 | |
| WO | 03/055815 A1 | 7/2003 | |
| WO | 2004/013776 A2 | 2/2004 | |
| WO | 2004/053771 A2 | 6/2004 | |
| WO | 2004/084099 A2 | 9/2004 | |
| WO | 2006/073977 A1 | 7/2006 | |
| WO | 2007/087629 A1 | 8/2007 | |
| WO | 2008/073502 A2 | 6/2008 | |

OTHER PUBLICATIONS

Office Action for U.S. Appl. No. 12/099,702, mailed on Jul. 22, 2010, 19 pages.

Notice of Allowance for U.S. Appl. No. 12/099,762, mailed on Mar. 16, 2011, 15 pages.

Chaves et al., "A Geographic Knowledge Base for Semantic Web Applications", In Proceedings of SBBD-05, the 20th Brazilian Symposium on Databases, 2005, pp. 40-54.

Delboni et al., "Geographic Web Search Based on Positioning Expressions", Proceedings of the 2005 workshop on Geographic information retrieval, Nov. 4, 2005, pp. 61-64.

Govindarajan et al., "Geo Viser. Geographic visualization of search engine results", Proceedings of Tenth International Workshop on Database and Expert Systems Applications, Sep. 1-3, 1999, pp. 269-273.

Gravano et al., "Categorizing Web Queries According to Geographical Locality", Proceedings of the 12th International Conference on Information and knowledge management, Nov. 3-8, 2003, pp. 325-333.

Markowetz et al., "Design and Implementation of a Geographic Search Engine", 8th International Workshop on the Web and Databases (WebDB), Jun. 16-17, 2005, 6 pages.

Martins et al., "A Graph-Ranking Algorithm for Geo-Referencing Documents", Proceedings of the 5th IEEE International Conference on Data Mining (ICDM '05), 2005, 4 pages.

Martins, et al., "Handling Locations in Search Engine Queries", Proceedings of the 3rd Workshop on Geographical Information Retrieval, 2006, 6 pages.

Morimoto et al., "Extracting Spatial Knowledge from the Web", Proceedings of the 2003 Symposium on Applications and the Internet, Jan. 27, 2003, pp. 1-22.

International Search Report for PCT Application No. PCT/US2005/047211, mailed on May 26, 3 pages.

International Preliminary Report on Patentability for PCT Application No. PCT/US2007/025695, mailed on Jun. 16, 2009, 7 pages.

International Search Report for PCT Application No. PCT/US2007/061133, mailed on Apr. 13, 2007, 3 pages.

International Preliminary Report on Patentability for PCT Application No. PCT/US2007/061133, mailed on Jul. 29, 2008, 8 pages.

Poliquen et al., "Geographical Information Recognition and Visualisation in Texts Written in Various Languages", Proceedings of the 2004 ACM Symposium on Applied Computing, Mar. 14, 2004, pp. 1051-1058.

Wang et al., "Detecting Dominant Locations from Search Queries", Proceedings of the 28th annual international ACM SIGIR conference on Research and development in information retrieval, Aug. 15-19, 2005, pp. 424-431.

Yates et al., "Searching the Web using a map", First International Conference on Web information System Engineering (WISE'2000) vol. 1, Jun. 19-21, 2000, pp. 222-229.

Zhang et al., "A GML-Based Open Architecture for Building a Geographical Information Search Engine Over the Internet", Proceedings of the 2nd International Conference on Web Information Systems Engineering, vol. 2, Dec. 3, 2001, pp. 25-32.

* cited by examiner

FIG. 2

DYNAMIC DETERMINATION OF LOCATION-IDENTIFYING SEARCH PHRASES

CROSS REFERENCE TO RELATED APPLICATIONS

This application is a continuation of, and claims priority to, U.S. Nonprovisional application Ser. No. 12/099,762, filed on Apr. 8, 2008, entitled "DYNAMIC DETERMINATION OF LOCATION-IDENTIFYING SEARCH PHRASES", which is hereby incorporated by reference in its entirety.

TECHNICAL FIELD

This description relates to online search and, in particular, to dynamic determination of location-identifying phrases.

BACKGROUND

When providing information (e.g., search results) in response to an online search query, it can be advantageous to know whether a phrase in the query relates to a particular location. For example, the ability to determine whether or not a query phrase refers to a location can be used to improve the quality of information provided in response to a query.

Some phrases in a query can be identified unambiguously as location-related phrases based on the phrase alone. For example, the phrase "San Francisco" when used in a query usually refers to "San Francisco, Calif., United States," even if additional location specifiers, such as "California" or "United States" are not used in the query. However, it is more difficult to determine if other phrases refer to a location when used in a search query. For example, the phrase "Orange" often could refer to a citrus fruit, but it could also refer to a city or county in California, or a city in New Jersey, Texas, Connecticut, Massachusetts, Virginia, Ohio, or New Hampshire.

SUMMARY

In a first general aspect, a computer-implemented method includes providing location factors for first phrases in a collection of phrases, where each location factor for a first phrase is associated with a likelihood that a second phrase of a search query is associated with a location when the first phrase and the second phrase are used in the search query. A search query is received, where the received search query includes a first phrase from the collection of phrases and a second phrase. Whether the second phrase of the received search query refers to a location is determined based, at least in part, on the location factor for the first phrase of the search query.

In another general aspect, a computer program product tangibly embodied on a computer-readable medium includes executable code that, when executed, is configured to cause a data processing apparatus to provide location factors for first phrases in a collection of phrases, each location factor for a first phrase being associated with a likelihood that a second phrase of a search query is associated with a location when the first phrase and the second phrase are used in the search query, receive a search query, the received search query including a first phrase from the collection of phrases and a second phrase, and determine whether the second phrase of the received search query refers to a location based, at least in part, on the location factor for the first phrase of the search query.

In another general aspect, a system includes a storage medium, a first server, and a first processor. The storage medium can be configured to store location factors for first phrases in a collection of phrases, where each location factor for a first phrase is associated with a likelihood that a second phrase of a search query is associated with a location when the first phrase and the second phrase are used in the search query. The first server can be configured to receive a search query, where the received search query includes a first phrase from the collection of phrases and a second phrase. The first processor can be configured to determine whether the second phrase of the received search query refers to a location based, at least in part, on the location factor for the first phrase of the search query.

Implementations can include one or more of the following features. For example, providing a location factor for a first phrase can include receiving a plurality of search queries, where each search query has a plurality of search phrases and at least some of the queries include the first phrase, providing search results in response to each of the plurality of search queries, receiving responses to the provided search results, and determining a location factor for the first phrase based on responses to the search results. The received search query can include an unstructured text query.

Determining a location factor for the first phrase based on the responses to the search results can includes determining a first frequency with which a search result associated with a known location is selected in response to search results presented for queries including the first phrase and a third phrase, determining a second frequency with which a search result associated with a known location is selected in response to search results presented for queries including the first phrase but not including the third phrase, and comparing the first frequency to the second frequency. Determining a location factor for the first phrase based on the responses to the search results can include determining how often responses to a search result associated with a known location are received relative to how often responses to a search result not associated with a known location are received. Determining a location factor for the first phrase based on the responses to the search results can also include determining a number of different known locations associated with the search results for which responses are received, and determining a distribution of the responses as a function of the different known locations.

Determining whether the second phrase refers to a location can include determining a language factor based on a language associated with the search query, and determining whether the second phrase refers to a location based, at least in part, on the language factor. Determining whether the second phrase refers to a location can include determining an origin factor based on an origin associated with the search query, and determining whether the second phrase refers to a location based, at least in part, on the origin factor. Determining the origin factor can included determining the origin factor based on a location from which the search query originates. Determining the origin factor can include determining the origin factor based on a domain name of a search engine through which the search query is received.

Furthermore, it can also be determined that the second phrase does not correspond to a location that can be identified by the second phrase alone by determining a name score indicating a popularity of the second phrase for the location, obtaining a signature for the location, where the signature includes a set of combinations of location specifiers, where each combination of location specifiers refers to the location, determining a signature score that indicates a popularity of the signature for the location, and determining that the location cannot be identified by the second phrase alone based on the name score and the signature score for the location.

Also, when the second phrase is determined to refer to a location, search results can be provided in response to the search query, where the search results are ranked to give preference to search results related to the location when providing the search results. At least some of the provided search results can be provided in a format designed for presenting location-specific search results. An advertiser can be billed for providing a search result that includes information related to the location referred to by the second phrase.

The computer program can also include executable code that, when executed, is configured to cause the data processing apparatus to determine that the second phrase does not correspond to a location that can be identified by the second phrase alone, by determining a name score indicating a popularity of the second phrase for the location, obtaining a signature for the location, where the signature includes a set of combinations of location specifiers, where each combination of location specifiers refers to the location, determining a signature score that indicates a popularity of the signature for the location, and determining that the location cannot be identified by the second phrase alone based on the name score and the signature score for the location.

Executable code can also be included that, when executed, is configured to cause the data processing apparatus to provide search results in response to the search query when the second phrase is determined to refer to a location, where the search results are ranked to give preference to search results related to the location when providing the search results. Executable code can also be included that, when executed, is configured to cause the data processing apparatus to provide at least some of the provided search results in a format designed for presenting location-specific search results. Executable code can also be included that, when executed, is configured to cause the data processing apparatus to bill an advertiser for providing a search result that includes information related to the location referred to by the second phrase.

The system can also include a second server and a second processor. The second server can be configured to receive a plurality of search queries, where each search query has a plurality of search phrases, including a first phrase, provide search results in response to each of the plurality of search queries, and receive responses to the provided search results. The second processor can be configured to determine a location factor for the first phrase based on responses to the search results and provide the location factor for the first phrase for storage in the storage medium.

The first processor can be further configured to determine that the second phrase does not correspond to a location that can be identified by the second phrase alone, by determining a name score indicating a popularity of the second phrase for the location, obtaining a signature for the location, where the signature includes a set of combinations of location specifiers, where each combination of location specifiers refers to the location, determining a signature score that indicates a popularity of the signature for the location, and determining that the location cannot be identified by the second phrase alone based on the name score and the signature score for the location. The first server can be further configured to provide search results in response to the search query when the second phrase is determined to refer to a location, where the search results being ranked to give preference to search results related to the location.

The details of one or more implementations are set forth in the accompanying drawings and the description below. Other features will be apparent from the description and drawings, and from the claims.

BRIEF DESCRIPTION OF THE DRAWINGS

FIG. 2 is a screen shot of a graphical user interface (GUI) showing search results presented in a format that gives preference to search results that are related to a location.

DETAILED DESCRIPTION

Figure 1:
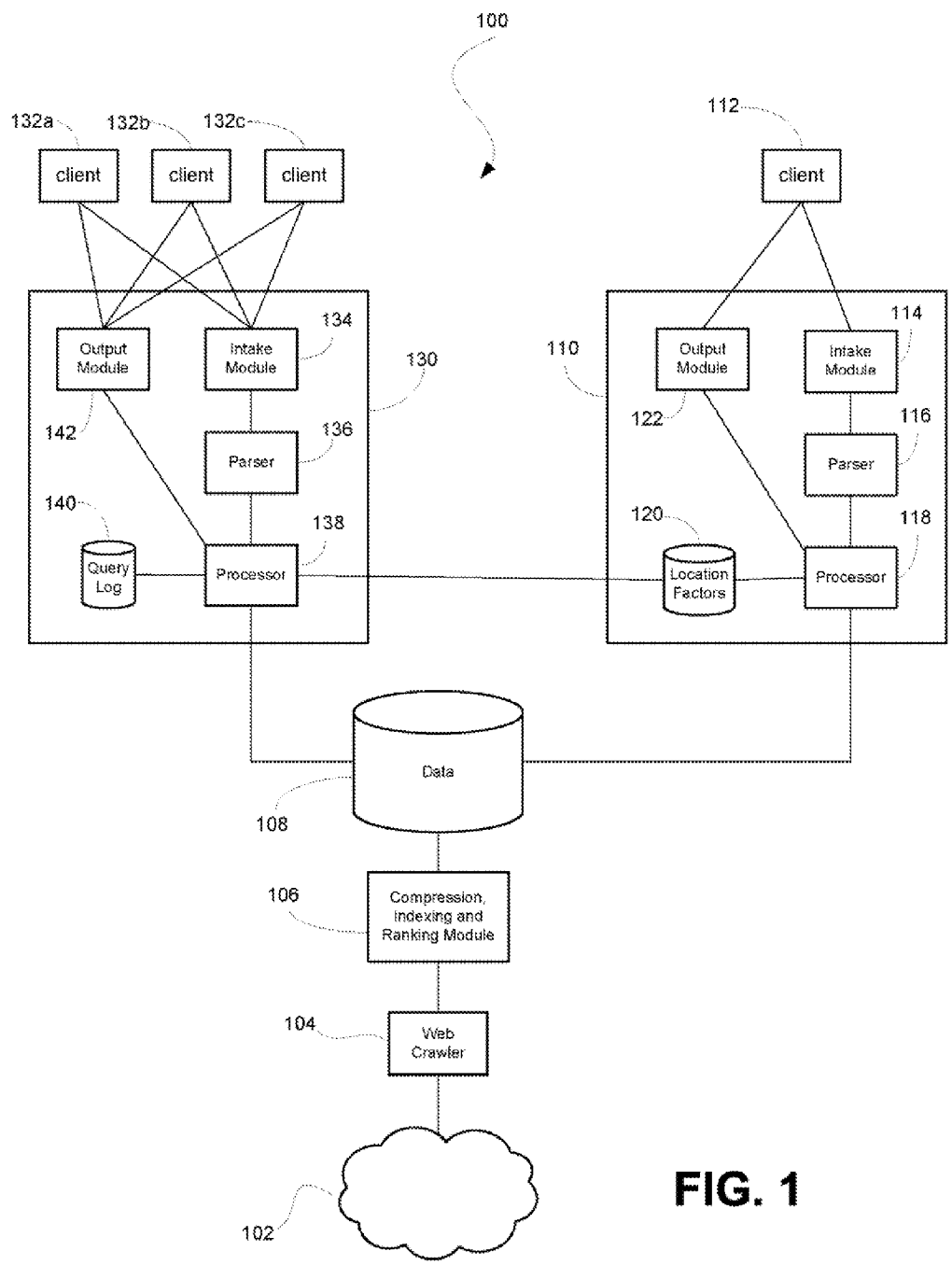
FIG. 1 is a schematic block diagram of a system for determining location-related phrases in a search query.

FIG. 1 is a schematic block diagram of a system 100 for identifying location-related phrases in a search query. Using the system 100, search queries can be presented to a search engine that returns search results in response to the query. The search results can include links to information, e.g., webpages available on the World Wide Web ("WWW"). By determining whether a phrase in a query refers to a location, the search engine can respond to the query by selecting search results that relate to the location.

In one implementation, a web crawler 104 can crawl or otherwise search through websites available on the WWW to select material (e.g., web pages, documents, audio files, and video files) for storage in an indexed form in a data center 108. A module 106 can compress, index, and rank the selected material before the material is stored in the data center 108. In addition to material available on the WWW, other material also can be stored in the data center, such as, for example, advertisements that an advertiser pays a search engine company to provide as a search result in response to a query.

During a search process, a client 112 may submit a search query to a search engine server 110 to request material relevant to the query. For example, a user of the client 112 can enter the query through a web browser running on the client 112. The query can be expressed in the form of an unstructured text string entered in a single entry field of the browser, and the query can include a number of phrases, where a phrase can be a single word, a group of words, or a character string. In another example, the query can be expressed in the form of structured text, for example, where different phrases of the query are entered into one more entry fields of the browser that are designated for receiving particular types of information (e.g., information relating to a product, a location, a price, etc.). The intake module 114 of the server 110 can receive the query from the client 112, and, in response to query, a search engine running on the server 110 can use phrases specified in the query as well as synonyms and stems for the phases to identify highly-ranked material that satisfy the query. The server 110 can return responses to the query through the web browser of the client 112, where the responses contain information (e.g., webpages, documents) satisfying the query along with ranking information and references to the identified documents. In some implementations, the query may include a text string that is generated from an audio file, e.g., when the user submits a query in the form of a spoken message that is converted to the text string through a voice recognition processor.

When a query is received by the server 110, the intake module 114 can pass the query to a parsing engine 116 that parses the query into different phrases. For example, the parsing engine 116 can parse the query <hotels in san francisco> into the phrases "hotels in" and "San Francisco." The phrases can be passed to a processor 118 that compares the phrases to a list of phrases that are known to refer to a particular location. Phrases that refer unambiguously to a known location may be known as "standalone locations" or "standalone location phrases." The list of standalone location phrases can be maintained in the data store 108, in a local data storage medium 120, or in any medium that is accessible to the processor 118. In the example of the query <hotels in san francisco>, because the phrase "San Francisco" by itself can be associated unambiguously with a known location (i.e., San Francisco, Calif., United States) the processor may therefore extract search results from the data store 108 that pertain to the location San Francisco, Calif., United States and may provide these results to the client 122 with a preference over search results that do not pertain to the identified location.

Identification of standalone locations is described in U.S. patent application Ser. No. 11/607,568, titled "Method and Apparatus for Identifying a Standalone Location" and in U.S. patent application Ser. No. 11/788,722, titled "Using a Query Log From a Two-Box Interface to Identify Standalone Locations," both of which are incorporated herein by reference. In one implementation, to determine whether a particular phrase is a standalone location phrase, a processor 118 can analyze the data in the data store to determine a "name score" for the phrase, where the name score provides an approximate number of webpages available through the WWW that contain the phrase. The processor 118 also can generate one or more "signatures" for the phrase, where a signature includes combinations of location specifiers (e.g., "Mountain View," "California," "94041," "United States of America," etc.) that are appended or prepended to the phrase such that the signature uniquely defines a location associated with the phrase. The processor 118 can determine a "signature score" for the phrase by determining an approximate number of webpages in the data store 108 that include at least one of the combinations of location specifiers in the signature. The processor 118 or 138 then can compute the ratio of the name score to the signature score for a particular phrase, and if the ratio is greater than or equal to a predefined threshold value, the phrase can be designated as a standalone location. If the ratio, which may be designated as a "standalone ratio," is less than the threshold value, the phrase can be determined not to be a standalone phrase.

For example, as shown in Table 1, the phrase "Houston," which appears in 283,000,000 webpages, can have the signatures, "Houston, Tex." and "Houston, Tex.," which appear in 81,800,000 webpages, for a standalone ratio of 0.289. The phrase "Harlingen," which appears in 105,700,000 webpages, can have the signatures, "Harlingen, Tex." and "Harlingen, Tex.," which appear in 1,692,000 webpages, for a standalone ratio of 0.158. The phrase "Orange," which appears in 558,000,000 webpages, can have, in one instance, the signatures, "Orange, Tex." and "Orange, Tex.," which appear in 623,000 webpages, for a standalone ratio of 0.001, and can have, in another instance, the signatures, "Orange, Calif." and "Orange, Calif.," which appear in 4,390,000 webpages, for a standalone ratio of 0.008. If the threshold for determining that a phrase is a standalone phrase is 0.14, then the phrases, "Houston," "Lubbock," and "Harlingen," in Table 1 can be classified as standalone phrases, while the phrase, "Orange" may be classified as not a standalone phrase. This is but one procedure for classifying phrases as standalone phrases, and other procedures are also possible.

TABLE 1

| Location | Signature | Name Score | Signature Score | Standalone Ratio | Standalone Phrase? |
|---|---|---|---|---|---|
| Houston | "Houston, TX" "Houston, Texas" | 283,000,000 | 81,800,000 | 0.289 | Yes |
| Lubbock | "Lubbock, TX" "Lubbock, Texas" | 15,500,000 | 10,800,000 | 0.697 | Yes |
| Harlingen | "Harlingen, TX" "Harlingen, Texas" | 105,700,000 | 1,692,000 | 0.158 | Yes |
| Orange | "Orange, TX" "Orange, Texas" | 558,000,000 | 623,000 | 0.001 | No |
| Orange | "Orange, CA" "Orange, California" | 558,000,000 | 4,390,000 | 0.008 | No |

In cases when the query does not contain a standalone location phrase, the processor 118 may determine whether a phrase in the query refers to a location by considering whether other phrases in the query are known to be used generally in queries that refer to locations. In one implementation, location factors, which may be quantitative or qualitative, can be associated with particular phrases that are often used in queries that target location-specific information. For example, location factors associated with the phrases "hotels in," "population of," "mayor of," and "DMV" (an abbreviation for Department of Motor Vehicles) would be relatively high because these phrases often are used in queries that target location-specific information. However, location factors associated with the phrases "citrus," "population genetics," and "juice" would be relatively low because these phrases generally are not often used in queries that target location-specific search results. A list of location factors associated with particular phrases can be maintained in the data store 108, in a local data storage medium 120, or in any medium that is accessible to the processor 118. Then, when a query is submitted from the client 112 to the server 110, the processor 118 can lookup the location factor of a phrase in the query to determine whether another phrase in the query refers to a location.

For example, when the query <hotels in orange> is submitted to the server the parsing engine 116 can parse the query into the phrases "hotels in" and "orange," and the processor 118 may determine that neither of these phrases is a standalone location phrase. However, when these phrases are passed to the processor 118, the processor can lookup the location factors for each phrase "hotels in" and "orange." Based on a high location factor for the phrase "hotels in," the processor 118 may determine that the phrase "orange" is associated with a location, when used in that particular query. Next, the processor may determine which of several known locations is referenced in the query. For example, as shown in Table 2 below, "Orange" is the name of nine cities or towns in the United States, with 2000 census populations ranging from 299 to 128,821.

TABLE 2

| Location | Population |
|---|---|
| Orange, CA | 128,821 |
| Orange, NJ | 32,686 |
| Orange, TX | 18,643 |
| Orange, CT | 13,233 |
| Orange, MA | 7518 |
| Orange, VA | 4123 |
| Orange, OH | 3236 |
| Orange, NY | 1752 |
| Orange, NH | 299 |

This information may be maintained in a database that is accessible to the processor 118 and used by the processor to determine which one of the nine locations is intended by the query <hotels in orange>. For example, when the processor 118 determines, based on the co-existence of the phrase "hotels in," with the phrase "Orange" that the phrase "Orange" refers to a location, the processor may determine, based on the information in Table 1, that Orange, Calif. is intended because Orange, Calif. has the highest population of all cites listed in Table 1. In another example, the location having the highest standalone ratio may be selected as the location that matches the phrase "Orange" in the query <hotels in orange>. Other methods of selecting one location from several possibilities can also be used after the processor has determined that a phrase in a query refers to a location, even though the phrase is not a standalone location phrase.

Figure 2:
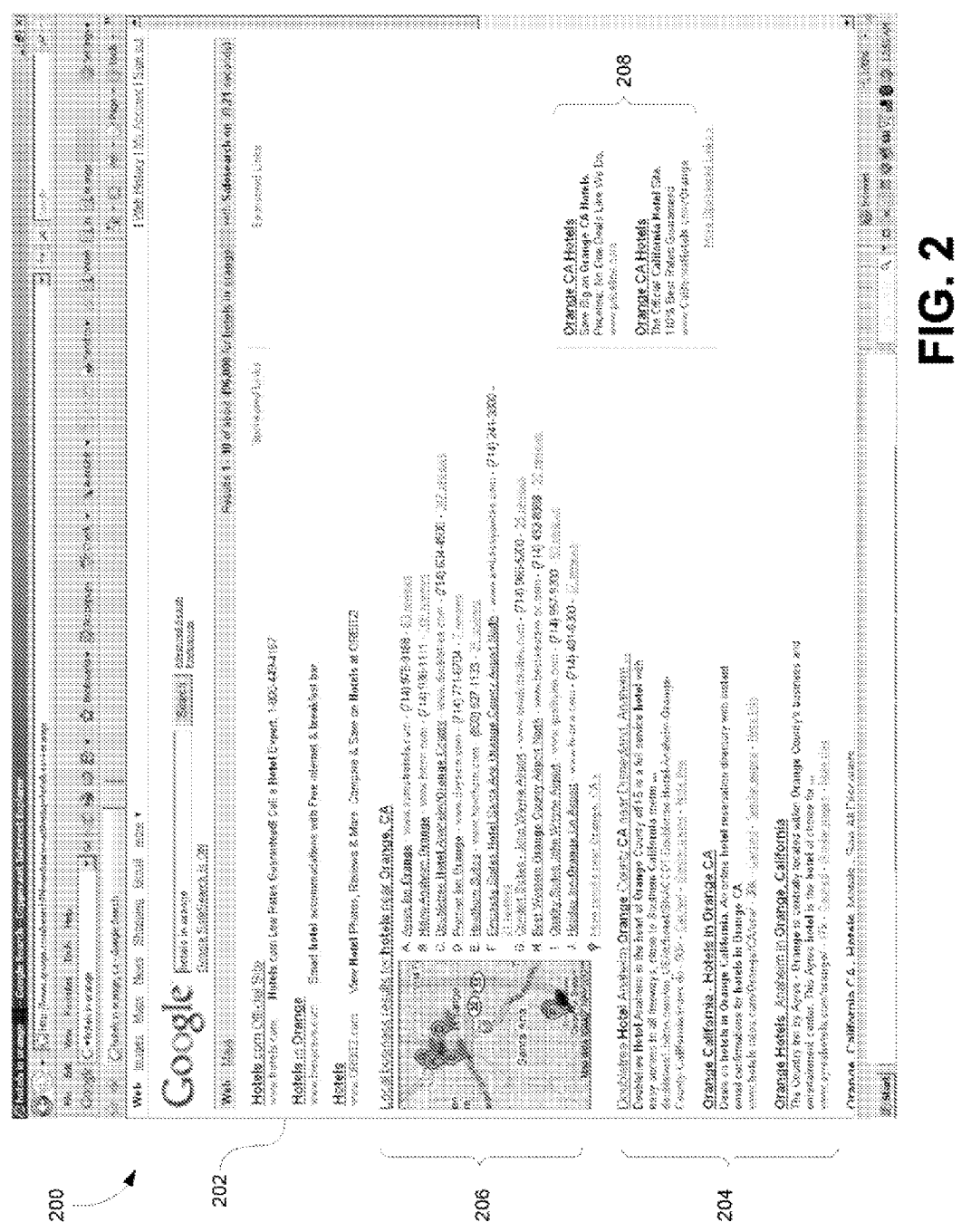

Once the processor has determined a particular location with which the query is associated, the processor can rank search results that match the query in a manner that gives preference to search results related to the particular location and present the results to a user according to the ranking. For example, FIG. 2 is a screen shot of a graphical user interface (GUI) showing search results presented in a format that gives preference to search results that are related to a location. The GUI can include a web browser 200 that has one or more search fields 202 in which a search query (e.g. <hotels in orange>) can be entered by a user and submitted to a search engine. The search fields 202 are examples of fields for entering and submitting an unstructured text query. When the search engine determines that the phrase "Orange" refers to the location Orange, Calif., the search engine can return results that are ranked and formatted to give preference to results that refer to the Orange, Calif. Thus, for example, the GUI can have a section 204 that presents search results that link to WWW materials that contain information related to the location. The GUI also can include a section 206 having a format designed for presenting location-specific results, for example, a format that presents search results that link to materials containing information about particular businesses in the location (e.g., the name, address, and phone number of the business and a link to a webpage of the business), or a format that includes a map of the location or a part of the location, which includes search results embedded in the map. Section 206 can be known as a "location onebox." In addition, the GUI can have a section 208 that presents search results related to advertisements that an advertiser pays an operator of the search engine to display in response to queries that relate to the particular location, and the operator can bill the advertiser for providing each result in section 208.

Referring again to FIG. 1, a location factor for a phrase can be generated based on an analysis of users' responses to search results that are provided for queries that include the phrase. Analysis of the users' responses can be used to determine whether a phrase typically is used in queries in which a user desires search results that refer to a particular location. For example, a server 130 can receive many queries from various different clients 132a, 132b, and 132c. An intake module 134 can process the incoming queries, and a parser 136 can parse the queries into phrases. A processor 138 then can analyze the phrases and provide search results from a data store 108 in response to the queries.

After the search results are provided to the client 132a, 132b, or 132c, a user may respond to the search results, and the user's response may be received by the server 130 through the intake module 134. A query log of the search transaction can be generated and stored in a storage medium 140, where the query log can include information about the query, the results provided in response to the query, and the user's response to the query. For example, the query log can include information about the location of the user that submitted the query, the language of the query, phrases in the query and the order of the phrases in the query, search results provided in response to the query, and whether in response to the search results the user selected none of the search results, selected a paid advertisement that was provided as a search result, or selected a search result that was presented in a format designed for presenting location-specific results. The query logs of many queries can be maintained in the data store 108, in a local data storage medium 140, or in any medium that is accessible to the processor 138.

After logs for many queries have been generated, the processor can analyze the logs for different queries that contain a common phrase to determine whether the phrase is used generally in queries that refer to locations. For example, to determine whether the phrase "DMV" is used generally in queries that refer to locations, logs for the queries <DMV San Francisco>, <DMV New York>, <DMV Chicago>, <DMV Toledo>, <DMV Peoria>, <DMV Primus>, <DMV Deutschland>, etc. can be analyzed. The queries <DMV San Francisco>, <DMV New York>, <Chicago DMV>, <Toledo DMV>, and <DMV Peoria> may be intended to elicit search results that pertain to the Department of Motor Vehicles in the city listed in the query. The query <DMV Primus> may be intended to elicit results that pertain to a song, "DMV," by the band, "Primus," and the query <DMV Deutschland> may be intended to elicit results pertaining to the Deutsche Mathematiker Vereinigung (German Mathematical Society). Logs for queries that contain the phrases "San Francisco," "New York," "Chicago," "Toledo," "Peoria," "Primus," and "Deutschland" but do not contain the phrase "DMV" can be analyzed and compared with the analysis of logs queries that do contain the phrase "DMV" to determine the value of the phrase "DMV" for predicting whether a query targets location-specific results.

In one implementation, a quantitative location factor can be determined by assigning scores for different user responses to search results provided for a query involving a phrase. For example, if a user selects a search result for a query with the phrase DMV, which was presented in a format designed for presenting location-specific results (e.g., in the location onebox region 206 of FIG. 2) a score of 1.0 may be assigned to the query. If the user selects a search result from an advertisement (e.g., from region 208 of FIG. 2), then a score of 0.2 may be assigned. If the user selects a search result that provides webpage results (e.g., from region 204 of FIG. 2), then a score of 0.2 may be assigned. If a user does not select any results then a score of 0.0 can be assigned. Because search results in a location onebox region 206 generally are associated with a known location, a user's selection of a search result from this region can indicate that the user intended the query to refer to a location. In one implementation, if the user responds to multiple search results for a query, then the highest score may be assigned as the score for the query.

After scores for individual queries are assigned, a location factor for a phrase is assigned by determining an amount by which the phrase increases the average score for any location. For example, if there are five queries that contains the phrase "Chicago," and for three of the queries the user responded by selecting a response from the location onebox region 206 and for two of the queries the user responded by selecting a webpage result from region 204, the average score for "Chicago" would be (3×1.0+2×0.2)/5=0.068. If there are two queries that contain the phrases "DMV" and "Chicago," and the user to responded in both cases by selecting a response from the location onebox region 206, the average score for "DMV Chicago" would be 1.0. The location factor for "DMV" can be determined by subtracting the score for "Chicago" used without "DMV" from the score for "DMV Chicago," which would yield a location factor for "DMV" of 0.32. Thus, a location factor for the phrase "DMV" can be determined by determining how often search results associated with a known location are selected in response to queries that include the phrase "DMV" and another phrase (e.g., "Chicago"), relative to how often search results associated with a known location are selected in response to a queries including the other phrase but not the phrase "DMV". This process can be repeated for other queries that include both the phrase DMV and another phrase (e.g., <DMV San Francisco>, <DMV New York>, <DMV Chicago>, <DMV Toledo>, <DMV Peoria>, <DMV Primus>, <DMV Deutschland>) and an overall location factor can be determined by averaging the location factors for all queries that involve the phrase.

Of course, variations on this procedure, and other procedures for determining location factors, are also contemplated. For example, in another implementation, a location factor for a phrase may be greater for phrases that it precedes than for phrases that it follows, or vice versa. Thus, for example, the phrase "hotels in" may have a higher location factor for the phrase "Orange" when used in the query <hotels in orange> than when used in the query <orange juice in hotels in Finland>.

In another implementation, the processor 138 can generate a location factor for a phrase based on how often the phrase is used with phrases that are known to be standalone location phrases. Thus, when queries are submitted from clients 132a, 132b, and 132c to the server 130, and parsed by the parser 136, the processor can determine a ratio between the number of times a phrase is used in a query with a standalone location phrase and the number of times the query is used without a standalone location phrase. Such an analysis may reveal, for example, that the phrase "population of" is often used in queries that include another phrase that refers to a location, whereas the phrases "population biology" and "population genetics" generally are not used in queries that include another phrase that refers to a location. Thus, the processor 138 could generate a location factor for the phrase "population of" that would be higher than a location factor for either of the phrases "population biology" or "population genetics."

Figure 3A:
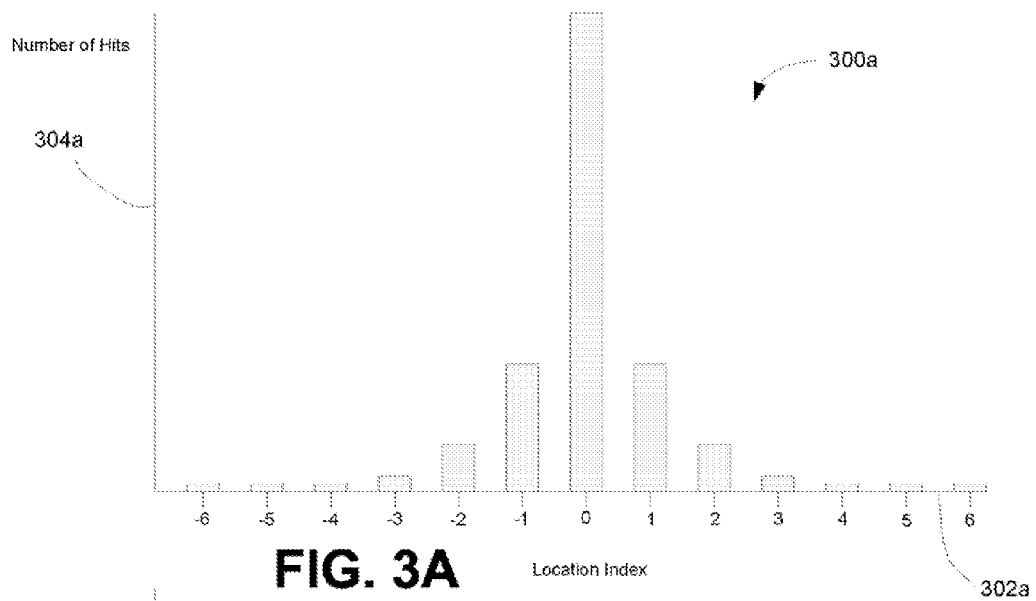
FIG. 3A is a schematic of a distribution of user responses to search results associated with a particular phrase, where a distribution of the results is narrowly clustered around a particular location.
Figure 3B:
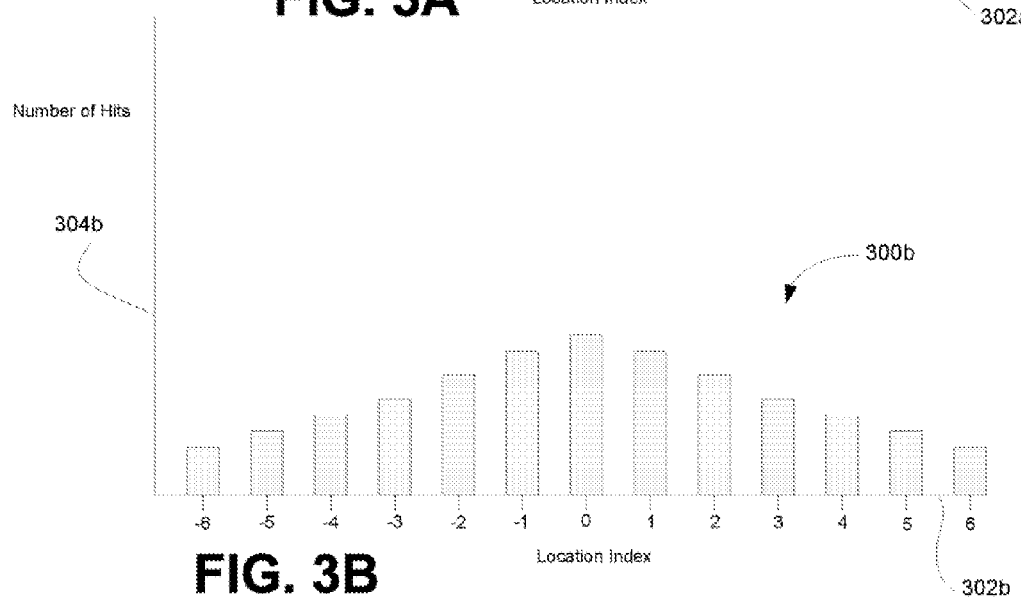
FIG. 3B is a schematic of a distribution of user responses to search results associated with a particular phrase, where a distribution of the results is broadly spread over many locations.

Another variation can be based on differences between results shown in FIGS. 3A and 3B, where FIG. 3A is a schematic diagram of a distribution 300a of user responses to search results associated with a particular phrase, where a distribution of the results is narrowly clustered around a particular location, and FIG. 3B is a schematic diagram of a distribution 300b of user responses to search results associated with a particular phrase, where a distribution of the results is broadly spread over many locations. The x-axes 302a and 300b of FIGS. 3A and 3B, respectively, show a location index, where the index number corresponds to a particular location, and the y-axes 304a and 304b show a number of user responses to a search result associated with a particular location index.

FIG. 3A could show a representative distribution 300a associated with the phrase "leaning tower," where the distribution is peaked narrowly around a location index that corresponds to the location "Pisa, Italy." The phrase "leaning tower" also may be used in queries that relate to other locations, however, these queries are relatively rare compared to queries that relate to Pisa, Italy. A narrow distribution may indicate that although the phrase "leaning tower" is closely associated with at least one particular location, the phrase, when used in a query, does not provide a good general indication that the query is related to a location. Thus, the predictive value of the phrase for determining whether another phrase in the query refers to a location may be relatively small.

FIG. 3B could show a representative distribution 300b associated with the phrase "hotels in," where the distribution is peaked broadly around a location index that corresponds to the location "New York, N.Y." A broad distribution may indicate that the phrase "hotels in" provides a good general indication that when the phrase is used in a query the query is related to a location. Thus, the predictive value of the phrase, when used in a query, for determining whether another phrase in the query refers to a location may be relatively high.

A distribution for a particular phrase can be fitted to a function (e.g., a Gaussian function), and a width of the distribution can be determined. Then, the location factor associated with the phrase may be determined or modified based on the width distribution.

After location factors for phrases have been determined they can be maintained in a medium (e.g., data storage medium 120) that is accessible by a processor (e.g., processor 118), so that location factors can be considered when determining whether a non-standalone location phrase in a query refers to a location based on a location factor for another phrase in the query. In one implementation, phrases having location factors below a predetermined threshold may be ignored or not maintained, so that only phrases that significantly increase the likelihood that a non-standalone location phrase in a query refers to a location are considered.

When a user of the client 112 submits a query to the search engine server 110, in addition to determining whether a phrase in the query refers to a location based on a location factors for another phrase in the query, the processor 118 also can determine whether the phrase refers to a particular location based on an origin factor associated with the query. The origin factor can provide information about the location of the user, the client, and/or a domain of the search engine to which the query is submitted, and the processor can use this information to determine a whether a phrase in a query refers to a location, or which of several possible locations the phrase refers to.

For example, when the query <bookstore in Cambridge> is submitted to the server 110, the processor 118 may determine that either of Cambridge, Mass., United States or Cambridge, England, United Kingdom may be the location referenced by the phrase "Cambridge." To choose between the two possibilities, the processor 118 may consider an origin factor for the query, which provides information about the likely region of interest for the user. For example, if the user submits the query to the server 110 through the domain www.google.com, the processor 118 may conclude that the location associated with the phrase "Cambridge" is Cambridge, Mass., United States, but if the user submits the query to the server 110 through the domain www.google.co.uk, the processor 118 may conclude that the location associated with the phrase "Cambridge" is Cambridge, England, United Kingdom. In another implementation, the processor 118 may determine whether the phrase "Cambridge" refers to a location based on location-identifying information associated with the client 112 and/or the user of the client that is submitted with the query (e.g., an Internet Protocol ("IP") address for the client 112 or a cookie containing address information for the user). Thus, an origin factor for a query originating from a client 112 having an IP address associated with a location in the UK may cause the processor to determine that the phrase "Cambridge" relates to Cambridge, England, United Kingdom, while an origin factor for a query originating from a client 112 having an IP address associated with a location in the USA may cause the processor to determine that the phrase "Cambridge" relates to Cambridge, Mass., United States.

An origin factor for a phrase used in a query can be quantified. For example, the origin factor for a phrase can be 0.2 if a possible location match for the phrase is in the same country from which the query originates and can be 0.0 if a possible location match is in a different country than the country in which the query originates.

An origin factor for a query may also be used on a finer scale to differentiate between different possible locations that a phrase in a query could refer to. For example, an IP address of the client 112 may be used to determine a location factor for a query at a regional, state, or town level. Such an origin factor may be used by the processor 118 to determine whether the phrase "Cambridge," when used in a query, refers to a location in Massachusetts, Maryland, Minnesota, or Ohio.

The processor 118 also can determine whether or not a phrase in a query from a client 112 refers to a location based on the language of the query. Because the same phrase can have different meanings in different languages, a phrase could indicate a location in one language but not in another language. Thus, determining the primary language associated with the query can be helpful for determining whether a phrase refers to a location or not.

For example, the query <hotel la luna> can be interpreted very differently depending on whether the query is written in English or in Spanish. If the query is written in English, the user may be seeking information about hotels in Los Angeles, Calif. that are close to a restaurant named Luna Park. However, if the query is written in Spanish, the user may be seeking information about a hotel with the phrase "La Luna" in its name. Thus, in the first case the phrase "LA" refers to a location, whereas in the second case the phrase "LA" is a definite object that modifies the noun "Luna" and therefore does not refer to a location. By determining the language of the query, a language factor can be generated for the query and used by the processor 118 to determine whether the phrase "LA" refers to a location or not.

Therefore, in one implementation, the intake module 114 can determine a language factor for a query when the query received by the server 110. The intake module 114 may determine the language of the query in a variety of ways. For example, a cookie associated with the client 112 that sends the query may specify a default language for the client and/or the user, and the client may pass this cookie to the intake module 114 when the client begins a search session with the server 110. In other examples, a preference setting in a browser running on the client may indicate a default language for search queries, and this information may be passed from the client 112 to the intake module 114. In another example, the language associated with queries from the user or the client can be determined based on analysis of the user's behavior during one or more search sessions. For example, the processor may monitor the language of the materials in search results selected by the user during one or more search sessions, and can associate a language with the user or client that corresponds to the language of the materials that are most frequently selected by the user. Once the language of the query is determined, the processor 118 can determine whether a phrase in the query has a higher or lower likelihood of being a location based on the language of the query.

A language factor for a phrase used in a query can be quantified. For example, locations can be identified with one or more languages that are spoken predominantly in the location. Thus, Rome, Italy could be associated with Italian, while Rome, New York, United States could be associated with English. In another example, a phrase that corresponds to a location can be identified with one or more languages where the spelling of the phrase corresponds to the location in such language(s). Thus, "Roma" could be associated with Italian, Spanish, Portuguese, etc. while "Rome" could be associated with English, and "Rom" could be associated with German. The processor can compare the language associated with a location or a phrase with a language of the query. Thus, the language factor for a possible location match for a phrase in the query can be 0.2 if language associated with the possible location match matches the language of the query and can be 0.0 if a match does not exist.

When considering whether a phrase used in a query refers to a location the influence of the phrase itself, of other phrases in the query, of the origin of the query, and of the language of the query may be represented by the function (1) below:

$$f(q)=f(i,j,k,l) \qquad (1)$$

where $f(q)$ is a function of how the phrase is used in the query, and the factors, i, j, k, and l refer, respectively, to the influence of the phrase itself (e.g., the degree to which the phrase is determined to be a standalone phrase, the influence of location factors for other phrases in the query, the influence of an origin factor for the query, and the influence of a language factor for the query. In one implementation, $f(q)$ may be represented as:

$$f(q)=\text{standalone ratio}+\text{location factor}+\text{origin factor}+ \\ \text{language factor} \qquad (2)$$

and only if $f(q)$ is greater than a threshold value then may the phrase be determined to refer to a location when used in the query. This algorithm can be applied in several examples, as discussed below.

In a first example, $f(q)$ can be used to determine whether the phrase "Orange" refers to a location when used in the queries <Orange Juice> and <Hotel in Orange>, where the user's location is in the US, and the language of the query is English. The value of $f(q)$ for the location "Orange, Calif." in the query <Orange Juice> is equal to 0.08 (the standalone ratio of Orange, Calif.)+0.0 (because the location factor for the phrase "juice" is below a predetermined threshold and therefore is ignored)+0.2 (because the location of the user matches the country of Orange, Calif.)+0.2 (because the language of the query matches the predominant language in Orange, Calif.), which is equal to a total score of 0.49. The value of $f(q)$ for the location "Orange, Calif." in the query <hotels in Orange> is equal to 0.08+0.32 (the location factor for the phrase "hotels in")+0.2 (because the location of the user matches the country of Orange, Calif.)+0.2 (because the language of the query matches the predominant language in Orange, Calif.), which is equal to a total score of 0.81. If a threshold for determining that a phrase in a query refers to a location is 0.6, then "Orange" in the query <Hotels in Orange> would be determined to refer to a location, while it would not be determined to refer to a location in the query <Orange Juice>.

In another example, $f(q)$ can be used to determine whether the phrase "Cambridge" refers to a location when used in the query <bookstore Cambridge>, where the user's location is in the US, and the language of the query is English. The value of $f(q)$ for the location "Cambridge, England, UK" in the query is equal to 0.49 (standalone ratio for the location)+0.0 (because the location factor for the phrase "bookstore" is below a predetermined threshold and therefore is ignored)+0.0 (because the user is in the US and the location is in the UK)+0.2 (because the language of the query matches the predominant language in Cambridge, England, UK), which is equal to a total score of 0.69. Similarly, the value of $f(q)$ for the location "Cambridge, Mass.," which has a standalone ratio of 0.45, in the query is equal to a total score of 0.85. Thus, if a threshold for determining that a phrase in a query refers to a location is 0.6, then the phrase "Cambridge" in this query would be determined to refer to Cambridge, Mass. However, if the user's location were the UK, then the phrase "Cambridge" in the query would be determined to refer to Cambridge, England, UK.

In another example, $f(q)$ can be used to determine whether the phrase "LA" refers to a location when used in the query <LA Empanada>, where the user's location is in the US, and the language of the query is English. The value of $f(q)$ for the location "Los Angeles, Calif., United States" in the query is equal to 0.22 (standalone ratio for the location)+0.0 (because the location factor for the phrase "empanada" is below a predetermined threshold and therefore is ignored)+0.2 (because the user location matches the country of Los Angeles, Calif., US)+0.2 (because the language of the query matches the predominant language in Los Angeles, Calif., US), which is equal to a total score of 0.62. Similarly, if the language of the query were Spanish, then the value of $f(q)$ for the location "Los Angeles, Calif., US" would be 0.42. Thus, if a threshold for determining that a phrase in a query refers to a location is 0.6, then the phrase "LA" in this query would be determined to refer to Los Angeles, Calif., US if the language of the query were English but not if the language of the query were Spanish.

Once a phrase in a query has been determined to refer to a location, the processor 118 can present search results selected from the data store 108 according to a ranking that gives preference to search results related to the location. For example, a onebox region 206 can be used in a GUI 200 to call attention to results that are related to the location. Also, an advertisement related to the location can be presented to the client 112 as a search result, and an operator of the server 110 can bill an advertiser for the presentation of the advertisement in response to the query.

Figure 4:
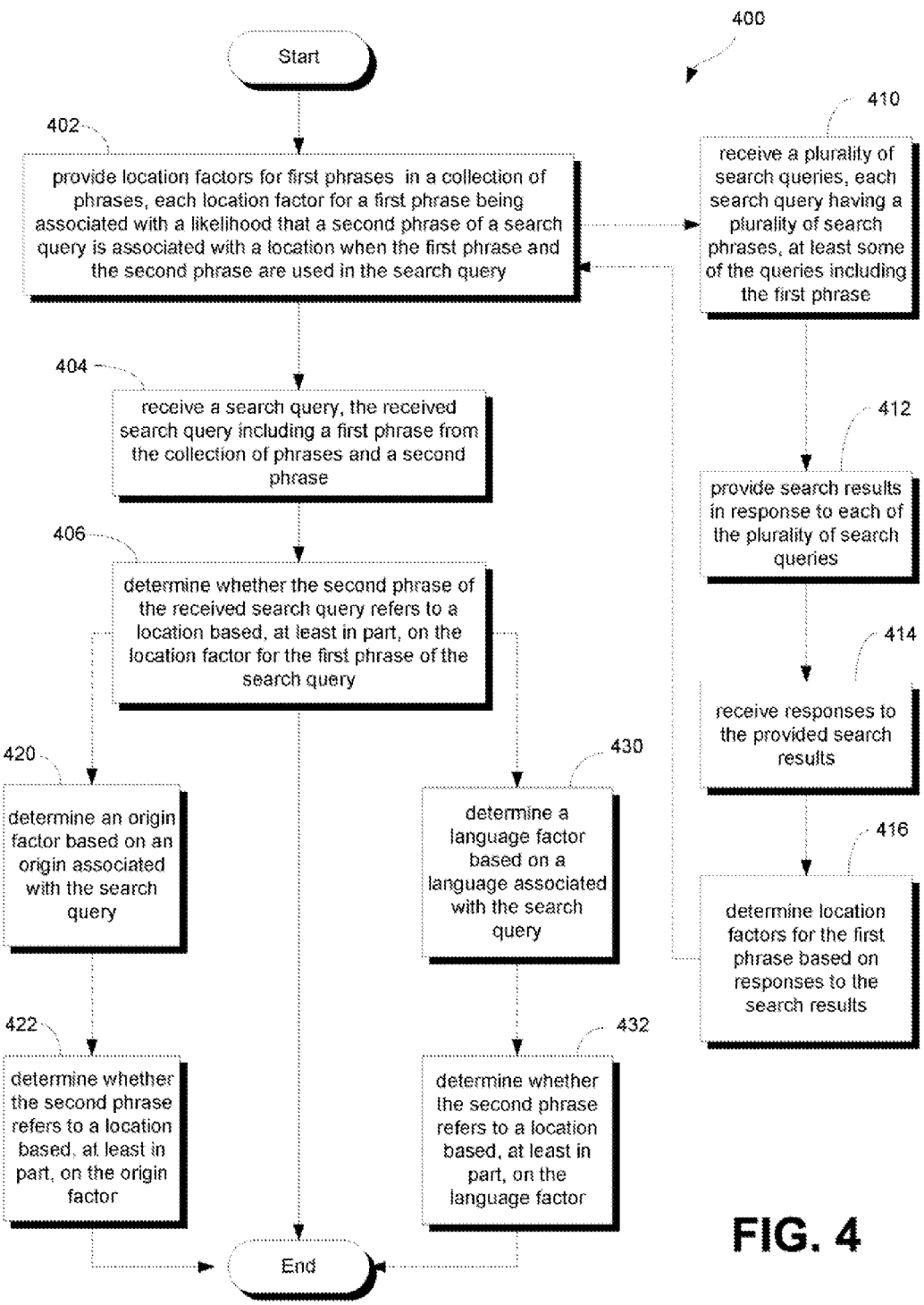
FIG. 4 is a flowchart illustrating example operations of the system of FIG. 1.

FIG. 4 is a flowchart illustrating example operations of the system of FIG. 1. As shown in FIG. 4, after a start operation, location factors can be provided for first phrases in a collection of phrases (step 402). For example, locations factors can be provided from the data storage medium 120. Each location factor for a first phrase is associated with a likelihood that a second phrase of a search query is associated with a location when the first phrase and the second phrase are used in the search query. A search query can be received (step 404), where the received search query includes a first phrase from the collection of phrases and a second phrase. For example, the search query can be received at the server 110 via the intake module 114. It can be determined whether the second phrase of the received search query refers to a location (step 406), and this determination can be based, at least in part, on the location factor for the first phrase of the search query. For example, processor 118 can determine whether a second phrase refers to a location based on the location factor for the first phrase. After the determination the process can end.

Providing a location factor for a first phrase (step 402) can include steps 410, 412, 414, and 416, as described below. A plurality of search queries can be received (step 410), where each search query has a plurality of search phrases, and at least some of the queries include the first phrase. For example, server 130 can receive many queries from clients 132a, 132b, and 132c. Search results can be provided in response to each of the plurality of search queries (step 412). For example, the server 130 can provide search results from the data store 108 to a requesting client 132a, 132b, or 132c through the output module 142 of the server. Then, responses to the provided search results can be received (step 414). For example, after the sever 130 provides search results to a client, the server can receive the client's response to the search results that were provided. Based on responses to the search results, a location factor for the first phrase can be determined (step 416). For example, processor 138 can analyze the client's response to search results that were provided in response to a plurality of queries, at least some of which included the first phrase, to determine a location factor for the first phrase.

Other example operations also can be performed. For example, an origin factor can be determined based on an origin associated with the search query (step 420). In one implementation, the intake module 114 can determine an origin of a query submitted from client 112 (e.g., based on an IP address associated with the client or based on the domain name of the search engine selected by the client), and the processor 118 can determine the origin factor based on the origin of the query. It can be determined whether the second phrase refers to a location based, at least in part, on the origin factor (step 422). For example, the processor 118 can determine whether the second phrase refers to a location based, at least in part on the origin factor for the query.

In another example, a language factor can be determined based on a language associated with the search query (step 430). In one implementation, the intake module 114 can determine a language of a query submitted from client 112, and the processor 118 can determine the language factor based on the language. It can be determined whether the second phrase refers to a location based, at least in part, on the location factor (step 432). For example, the processor 118 can determine whether the second phrase refers to a location based, at least in part on the location factor for the query.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a stored signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A computer-implemented method performed by one or more processors comprising:
receiving a search query, the received search query including a first phrase and a second phrase;
identifying the second phrase as a possible name of a location;
determining that the second phrase of the received search query refers to the location based, at least in part, on a location factor for the first phrase of the search query,
wherein the location factor for the first phrase is determined by analyzing a plurality of previously received search queries containing the first phrase and previously provided user interactions with the search results provided in response to the plurality of previously received search queries, wherein the analyzing further includes determining a frequency with which the plurality of previously received search queries containing the first phrase contain a location identified as a standalone location to a frequency with which the plurality of previously received search queries containing the first phrase contain a location that is not identified as a standalone location.

2. The method of claim 1, wherein analyzing a plurality of previously received search queries containing the first phrase and previously provided user interactions with the search results provided in response to the plurality of previously received search queries further comprises:
determining a frequency with which previously provided user interactions are with search results that are associated with a known location relative to a frequency with which previously provided user interactions are with search results that are not associated with a known location.

3. The method of claim 2, wherein analyzing a plurality of previously received search queries containing the first phrase and previously provided user interactions with the search results provided in response to the plurality of previously received search queries further comprises:
determining a distribution of the previously provided user interactions with search results as a function of the locations with which those search results are associated; and
determining the location factor as a measure of the width of the distribution.

4. The method of claim 1, further comprising:
determining that the second phrase refers to a location based, at least in part, on a language associated with the search query.

5. The method of claim 1, further comprising:
determining that the second phrase refers to a location based, at least in part, on an origin associated with the search query.

6. The method of claim 5, wherein the origin associated with the search query is based on a location of a device from which the search query originates.

7. The method of claim 5, wherein the origin associated with the search query is based on a domain name of a search engine at which the search query is received.

8. The method of claim 1, further comprising:
providing search results in response to the search query, the search results being ranked to give preference to search results related to the location.

9. The method of claim 8, further comprising billing an advertiser for providing a search result that includes information related to the location referred to by the second phrase.

10. The method of claim 1, wherein the received search query includes an unstructured text query.

11. A computer-implemented method performed by one or more processors comprising:
receiving a search query, the received search query including a first phrase and a second phrase;
identifying the second phrase as a possible name of a location;
determining that the second phrase of the received search query refers to the location based, at least in part, on a location factor for the first phrase of the search query, wherein the location factor for the first phrase is determined by analyzing a plurality of previously received search queries containing the first phrase and previously provided user interactions with the search results provided in response to the plurality of previously received search queries;

providing search results in response to the search query, the search results being ranked to give preference to search results related to the location; and providing at least some of the search results in a format designed for presenting location-specific search results.

12. A computer program product tangibly embodied on a computer-readable storage medium and including executable code that, when executed, is configured to cause one or more processors to:

receive a search query, the received search query including a first phrase and a second phrase;

identify the second phrase as a possible name of a location; and determine that the second phrase of the received search query refers to the location based, at least in part, on a location factor for the first phrase of the search query, wherein the location factor for the first phrase is determined by analyzing a plurality of previously received search queries containing the first phrase and previously provided user interactions with the search results provided in response to the plurality of previously received search queries, wherein the analyzing further includes determining a frequency with which previously provided user interactions are with search results that are associated with a known location relative to a frequency with which previously provided user interactions are with search results that are not associated with a known location.

13. The computer program product of claim 12, wherein analyzing a plurality of previously received search queries containing the first phrase and previously provided user interactions with the search results provided in response to the plurality of previously received search queries further comprises:

determining a distribution of the previously provided user interactions with search results as a function of the locations with which those search results are associated; and determining the location factor as a measure of the width of the distribution.

14. The computer program product of claim 12, further comprising executable code that, when executed, is configured to cause the data processing apparatus to:

provide search results in response to the search query, the search results being ranked to give preference to search results related to the location.

15. The computer program product of claim 14, further comprising executable code that, when executed, is configured to cause the data processing apparatus to:

provide at least some of the search results in a format designed for presenting location-specific search results.

16. The computer program product of claim 14, further comprising executable code that, when executed, is configured to cause the data processing apparatus to:

bill an advertiser for providing a search result that includes information related to the location referred to by the second phrase.

17. The computer program product of claim 12, wherein the received search query includes an unstructured text query.

18. A system comprising:

one or more storage mediums having computer instructions stored thereon;

one or more processors executing the computer instructions stored in the one or more storage mediums in order to:

receive a search query, the received search query including a first phrase and a second phrase;

identify the second phrase as a possible name of a location;

determine that the second phrase of the received search query refers to the location based, at least in part, on a location factor for the first phrase of the search query, wherein the location factor for the first phrase is determined by analyzing a plurality of previously received search queries containing the first phrase and previously provided user interactions with the search results provided in response to the plurality of previously received search queries, wherein the analyzing further includes determining a frequency with which previously provided user interactions are with search results that are associated with a known location relative to a frequency with which previously provided user interactions are with search results that are not associated with a known location.

19. The system of claim 18, wherein analyzing a plurality of previously received search queries containing the first phrase and previously provided user interactions with the search results provided in response to the plurality of previously received search queries further comprises:

determining a distribution of the previously provided user interactions with search results as a function of the locations with which those search results are associated; and determining the location factor as a measure of the width of the distribution.

20. The system of claim 18, further comprising:

provide search results in response to the search query, the search results being ranked to give preference to search results related to the location.

* * * * *